United States Patent
Luo et al.

(10) Patent No.: US 11,250,550 B2
(45) Date of Patent: Feb. 15, 2022

(54) IMAGE PROCESSING METHOD AND RELATED DEVICE

(71) Applicant: HUAWEI TECHNOLOGIES CO., LTD., Guangdong (CN)

(72) Inventors: Lijun Luo, Shenzhen (CN); Liyu Zhu, Nanjing (CN); Bujun Que, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 27 days.

(21) Appl. No.: 16/943,497

(22) Filed: Jul. 30, 2020

(65) Prior Publication Data
US 2020/0357104 A1    Nov. 12, 2020

Related U.S. Application Data

(63) Continuation of application No. PCT/CN2018/123383, filed on Dec. 25, 2018.

(30) Foreign Application Priority Data

Feb. 9, 2018   (CN) .......................... 201810135739.1

(51) Int. Cl.
*G06T 5/50* (2006.01)
*G06T 5/00* (2006.01)

(52) U.S. Cl.
CPC ............... *G06T 5/50* (2013.01); *G06T 5/001* (2013.01); *G06T 2207/10024* (2013.01); *G06T 2207/10048* (2013.01); *G06T 2207/20221* (2013.01)

(58) Field of Classification Search
CPC . G06T 5/50; G06T 5/001; G06T 2207/10024; G06T 2207/10048;
(Continued)

(56) References Cited

U.S. PATENT DOCUMENTS 9,398,235 B2 *   7/2016   Bae .................... H04N 5/332
10,560,686 B2 *   2/2020   Xu ..................... H04N 13/254
(Continued)

FOREIGN PATENT DOCUMENTS

CN    103793896 A    5/2014
CN    103973990 A    8/2014
(Continued)

OTHER PUBLICATIONS

Yuren Zhou et al.,"Contrast Enhanced Fusion of Infrared and Visible Images", Chinese Journal of Lasers, vol. 41. No. 9, Sep. 2014, total 7 pages.
(Continued)

*Primary Examiner* — Mekonen T Bekele (57) ABSTRACT

An image processing method and a related device are provided to obtain a target image wherein texture of the obtained image is clearer, the image processing method includes: obtaining a visible light image and an infrared light image; obtaining first luminance information of the visible light image and second luminance information of the infrared light image; fusing the first luminance information and the second luminance information, to obtain a contrast fusion image; obtaining first texture information of the visible light image and second texture information of the infrared light image; fusing the first texture information, the second texture information, and the contrast fusion image, to obtain a texture fusion image; obtaining a color fusion image based on the visible light image and the infrared light image; and fusing the texture fusion image and the color fusion image, to obtain a target image.

19 Claims, 6 Drawing Sheets

(58) Field of Classification Search
CPC ........ G06T 2207/20221; H04N 13/254; H04N 5/261; H04N 5/243; H04N 5/33; H04N 5/265

See application file for complete search history.

(56) References Cited

U.S. PATENT DOCUMENTS

| | | |
|---|---|---|
| 2008/0036576 A1 | 2/2008 | Stein et al. |
| 2011/0261207 A1 | 10/2011 | Strandemar |
| 2014/0168444 A1 | 6/2014 | Bae et al. |
| 2020/0193644 A1* | 6/2020 | Shibata ............... H04N 7/18 |
| 2021/0118111 A1* | 4/2021 | Ti ...................... G06K 9/4671 |
| 2021/0150742 A1* | 5/2021 | Sato ................... G01S 17/48 |
| 2021/0218948 A1* | 7/2021 | Zhu .................... H04N 5/2351 |

FOREIGN PATENT DOCUMENTS

| | | | |
|---|---|---|---|
| CN | 104732507 A | | 6/2015 |
| CN | 104966108 A | * | 10/2015 |
| CN | 104966108 A | | 10/2015 |
| CN | 105303598 A | | 2/2016 |
| CN | 105513032 A | | 4/2016 |
| CN | 106548467 A | | 3/2017 |
| CN | 106600572 A | | 4/2017 |
| CN | 106600572 A | * | 4/2017 |
| CN | 106875370 A | | 6/2017 |
| CN | 107133558 A | | 9/2017 |
| CN | 107346552 A | | 11/2017 |
| JP | 2006072401 A | | 3/2006 |
| JP | 2011239259 A | | 11/2011 |
| JP | 2012085182 A | | 4/2012 |
| WO | 2017020595 A1 | | 2/2017 |
| WO | 2018017904 A1 | | 1/2018 |
| WO | WO-2019196539 A1 | * | 10/2019 ............... G06T 5/50 |
| WO | WO-2020051897 A1 | * | 3/2020 ............... G06T 5/50 |

OTHER PUBLICATIONS

Guangxin Li et al.,"Luminance-contrast transfer based fusion algorithm for infrared and color visible images", Chinese Optics, vol. 4, No. 2,Apr. 2011, total 8 pages.

Xiaoye Zhang et al., "Infrared and visible image fusion via saliency analysis and local edge-preserving multi-scale decomposition", Journal of the Optical Society of America A, vol. 34, No. 8 / Aug. 2017, total 11 pages.

Takashi Shibata et al.,"Versatile visible and near-infrared image fusion based on high visibility area selection",Journal of Electronic Imaging, vol. 25(1), 013016 (2016), total 17 pages.

Tanish Zaveri et al.,"An Optimized Region-based Color Transfer Method for Night Vision Application",978--4244-8594-9/10/$26.00 2010 IEEE,Total 6 Pages.

Ishit Makwana et al.,"Efficient Color Tran sf er Method based on Colormap Clustering for Night Vision Applications",2011 Third National Conference on Computer Vision, Pattern Recognition, Image Processing and Graphics,Total 4 Pages.

Salman Mahmood et al.,"A treatise to vision enhancement and color fusion techniques in night vision devices", Multimed Tools Appl (2018) 77:2689-2737,total 49 pages.

Shuo Liu et al.,"Research on fusion technology based on low-light visible image and infrared image",Optical Engineering,Opt. Eng. 55(12), 123104 (2016), doi: 10.1117/1.0E.55.12.123104,total 10 pages.

Extended European Search Report in corresponding European Application No. 18 90 5692 dated Feb. 24, 2021, 9 pages.

Japanese Notice of Allowance for Application No. 2020-542815 dated Sep. 3, 2015, 3 pages.

* cited by examiner

IMAGE PROCESSING METHOD AND RELATED DEVICE

CROSS-REFERENCE TO RELATED APPLICATIONS

This application is a continuation of International Application No. PCT/CN2018/123383, filed on Dec. 25, 2018, which claims priority to Chinese Patent Application No. 201810135739.1, filed on Feb. 9, 2018. The disclosures of the aforementioned applications are hereby incorporated by reference in their entireties.

TECHNICAL FIELD

This application relates to the image field, and in particular, to an image processing method and a related device.

BACKGROUND

With the development of photographing technologies, in high illumination, a camera device can photograph a clear image. However, in low illumination, a photographed image is usually unclear. Therefore, improving image definition in low illumination is an urgent problem to be resolved for camera devices.

In a conventional solution, in an optical imaging system, light rays may be separated based on a band and a ratio by using a light splitting apparatus, and a visible light image and an infrared light image are obtained by separately imaging frequency components obtained from separation. The visible light image is a color image, and the infrared light image is a non-color image. Then, image fusion is performed on the visible light image and the infrared light image by using a preset fusion algorithm, that is, images on frequency components of the obtained visible light image and infrared light image are fused, to obtain a target image after fusion. A color component of the target image is from the visible light image. After luminance and texture of the target image are determined, fusion is performed based on the color component, to obtain the target image.

Because the infrared light image and the visible light image differ widely in luminance distribution, and objects of different materials have different reflection coefficients under a visible light and infrared light, the infrared light image and the visible light image have a distinct difference in luminance Especially, in low illumination, the infrared light image and the visible light image differ widely in texture distribution and luminance distribution. Usually, the infrared light image is clearer than the visible light image, and the infrared light image has richer texture. Therefore, texture information of the infrared light image occupies a relatively large proportion during image fusion. Consequently, image texture of the target image after the fusion is closer to image texture under the infrared light and differs greatly from actual texture of the image, and severe distortion is caused.

SUMMARY

Embodiments of this application provide an image processing method and a related device, to process an image obtained by an optical imaging system, to be specific, to perform contrast, texture, and color processing on the image, so that texture of the obtained image is clearer, and the texture and color are closer to actual texture and an actual color. This is true especially in a low illumination scenario.

In view of this, according to a first aspect of this application, an image processing method is provided, and the image processing method includes: obtaining a visible light image and an infrared light image; obtaining first luminance information and second luminance information, where the first luminance information is luminance information of the visible light image, and the second luminance information is luminance information of the infrared light image; fusing the first luminance information and the second luminance information, to obtain a contrast fusion image; obtaining first texture information and second texture information, where the first texture information is texture information of the visible light image, and the second texture information is texture information of the infrared light image; fusing the first texture information, the second texture information, and the contrast fusion image, to obtain a texture fusion image; obtaining a color fusion image based on the visible light image and the infrared light image; and fusing the texture fusion image and the color fusion image, to obtain a target image.

In this implementation of this application, first, the first luminance information is obtained from the visible light image and the second luminance information is obtained from the infrared light image. The first luminance information and the second luminance information are fused to obtain the contrast fusion image. The luminance information is separately extracted, so that noise in the contrast fusion image can be reduced, and luminance distribution in the contrast fusion image may be more even and closer to luminance distribution under a visible light. Subsequently, the first texture information is extracted from the visible light image, and the second texture information is extracted from the infrared light image. Then, the first texture information, the second texture information, and the contrast fusion image are fused to obtain the texture fusion image, so that the obtained texture fusion image has clearer texture. In addition, color fusion may be performed on the infrared light image and the visible light image, to obtain the color fusion image, in which the infrared light image is used as a basis of the color fusion image, so that color loss, a color cast, large noise, or another case can be reduced. Finally, the color fusion image and the texture fusion image are fused to obtain the target image, so that noise of the target image can be reduced, texture of the target image is clearer, and luminance distribution is closer to luminance distribution under the visible light.

With reference to the first aspect of this application, in a first implementation of the first aspect of this application, the obtaining a color fusion image based on the visible light image and the infrared light image may include: performing color perception restoration on the visible light image, to obtain a color perception restoration image; performing color inference on the infrared light image based on a preset color correspondence, to obtain a color inference image; and fusing the color perception restoration image and the color inference image, to obtain the color fusion image.

In this implementation of this application, color perception restoration may be performed on the visible light image. To be specific, perception restoration may be performed on a color of the visible light image, and some missing colors may be restored. Because a color component of the infrared light image has a correspondence with a color component under the visible light, color inference may be performed on the infrared light image based on the preset color correspondence, to obtain the color inference image. Then, the color perception restoration image and the color inference image are fused, to obtain the color fusion image. A color component in the color inference image may be used to fill a part with color loss, a part with a color cast or a part with large noise under the visible light. This makes a color of the color fusion image more complete, reduces noise in the color fusion image, further reduces color noise of the target image, and improves the color loss, the color cast, or another case.

With reference to the first aspect of this application or the first implementation of the first aspect of this application, in a second implementation of the first aspect of this application, the fusing the first luminance information and the second luminance information, to obtain a contrast fusion image may include: calculating the first luminance information and the second luminance information by using a preset first formula, to obtain a target luminance value; and obtaining the contrast fusion image based on the target luminance value.

In this implementation of this application, the first luminance information and the second luminance information may be calculated by using the preset first formula. This is a new manner of obtaining the contrast fusion image.

With reference to the first aspect of this application, and either the first implementation of the first aspect of this application or the second implementation of the first aspect of this application, in a third implementation of the first aspect of this application, the fusing the first texture information, the second texture information, and the contrast fusion image, to obtain a texture fusion image may include: calculating the first texture information and the second texture information by using a preset second formula, to obtain a target texture pixel value; and superimposing the target texture pixel value to the contrast fusion image, to obtain the texture fusion image.

In this implementation of this application, the first texture information and the second texture information may be calculated by using the preset second formula. This is a new manner of obtaining the texture fusion image.

With reference to the first implementation of the first aspect of this application, in a fourth implementation of the first aspect of this application, the performing color inference on the infrared light image based on a preset color correspondence, to obtain a color inference image may include: determining a proportion of a color component of the infrared light image based on the preset color correspondence; and determining a target color based on the proportion of the color component in a preset calculation manner, to obtain the color inference image.

A specific process of obtaining the color inference image may be: determining a proportion of a color component in the color inference image based on the color component of the infrared light image and based on the preset color correspondence, to obtain the color inference image. This is a new manner of obtaining the color inference image.

With reference to the first implementation of the first aspect of this application or the fourth implementation of the first aspect of this application, in a fifth implementation of the first aspect of this application, the performing color perception restoration on the visible light image, to obtain a color perception restoration image may include: inverting luminance of the visible light image, to obtain a luminance inversion image; calculating the luminance inversion image based on a defogging algorithm, to obtain an enhanced image of enhanced luminance and an enhanced color; and inverting the enhanced image, to obtain the color perception restoration image.

In this implementation of this application, the luminance of the visible light image may be inverted, and then the inverted visible light image is calculated by using the defogging algorithm, to obtain the image of enhanced luminance and an enhanced color. Then the image of enhanced luminance and an enhanced color is inverted, and the color perception restoration image of an enhanced color and enhanced luminance may be obtained.

With reference to the first aspect of this application, or any one of the first implementation of the first aspect of this application to the fifth implementation of the first aspect of this application, in a sixth implementation of the first aspect of this application, the fusing the texture fusion image and the color fusion image, to obtain a target image may include: fusing luminance information of the texture fusion image and a color component in the color fusion image, to obtain the target image.

The luminance information of the texture fusion image and the color component in the color fusion image are determined. Then, the luminance information and the color component are superimposed, or are fused through proportional calculation, or the like, to obtain the target image, so that a color of the target image is more complete, and problems such as a color cast, a large noise, vague texture, and a great difference between luminance distribution of the target image and luminance distribution under visible light can be improved.

According to a second aspect of this application, an image processing apparatus is provided. The image processing apparatus has a function of implementing the image processing method corresponding to the first aspect or any one of the implementations of the first aspect of this application. The function may be implemented by hardware, or implemented by hardware executing corresponding software. The hardware or the software includes one or more modules corresponding to the foregoing function.

According to a third aspect of this application, an image shooting apparatus is provided. The image shooting apparatus may include: at least one lens, a processor, a memory, a bus, and an input/output interface. The at least one lens is configured to obtain an optical image. The memory is configured to store program code. When invoking the program code in the memory, the processor performs the steps in the first aspect or any one of the implementations of the first aspect in this application.

According to a fourth aspect of this application, a terminal device is provided, and the terminal device includes: at least one lens, a processor, a memory, a bus, and an input/output interface. The at least one lens is configured to obtain an optical image. The memory is configured to store program code. When invoking the program code in the memory, the processor performs the steps in the first aspect or any one of the implementations of the first aspect in this application.

According to a fifth aspect of this application, a storage medium is provided. It should be noted that the technical solution of this application essentially, or the part contributing to the prior art, or all or a part of the technical solution may be implemented in a form of a software product. The computer software product is stored in the storage medium, configured to store a computer software instruction used by the foregoing device. The computer software instruction includes a program designed for executing the first aspect.

The storage medium includes various mediums that can store program code, such as a USB flash drive, a removable hard disk, a read-only memory (ROM), a random access memory (RAM), a magnetic disk, or an optical disc.

According to a sixth aspect of the embodiments of this application, a computer program product including an instruction is provided, and when the instruction is run on a computer, the computer is enabled to perform the method according to the first aspect or any one of the optional implementations of the first aspect of this application.

According to a seventh aspect of this application, a chip system is provided. The chip system includes a processor, configured to support an image processing apparatus in implementing the function in the first aspect, for example, transmitting or processing the data and/or information in the foregoing method.

In a possible implementation, the chip system further includes a memory. The memory is configured to store a necessary program instruction and necessary data in the image processing method. The chip system may include a chip, or may include a chip and another discrete device.

It can be learned from the foregoing technical solutions that the embodiments of this application have the following advantages:

In the embodiments of this application, after the visible light image and the infrared light image are obtained, the contrast fusion image of enhanced contrast may be obtained based on the luminance information of the visible light image and the luminance information of the infrared light image. Then, when texture fusion is performed, texture fusion is performed on the texture information of the visible light image and the texture information of the infrared light image, to obtain a texture fusion image with clearer texture. Then, the color fusion image is obtained based on the infrared light image and the visible light image. In this way, the color fusion image is obtained based on the infrared light image and the visible light image. The color fusion image and the texture fusion image are fused, to obtain the target image whose color is closer to an actual color. The texture fusion image is determined based on the luminance information and texture information of the infrared light image and the visible light image. Compared with the conventional solution in which the texture fusion image is determined only based on a ratio of the texture information of the infrared light image to the texture information of the visible light image, in the embodiments of this application, texture fusion is performed with reference to the contrast of the visible light image and the infrared light image, so that texture of the obtained texture fusion image is clearer, the luminance and texture of the target image are closer to actual luminance and texture under the visible light, and therefore image distortion is reduced.

DESCRIPTION OF EMBODIMENTS

An embodiment of this application provides an image processing method and a related device, to process an image obtained by an optical imaging system, to be specific, to perform contrast, texture, and color processing on the image, so that texture of the obtained image is clearer, and the texture and the color are closer to actual texture and an actual color. Image improvements provided by the embodiments are advantageous especially for images captured in a low illumination scenario.

Photography technologies are widely applied to daily life, industry, business, or other fields. For example, a monitoring device plays an important role in industry and business, and the definition of an image obtained by the monitoring device is constantly required to be improved. However, in a conventional solution, a clear image can be obtained only in a favorable illumination condition. In a low illumination scenario, because an IR-CUT filter (a low-pass filter) filters out infrared light in the surrounding environment of the monitoring device, the infrared light in the environment cannot be effectively used, and the overall luminous flux of the obtained image is reduced. In the conventional solution, a visible light image and an infrared light image are directly fused using a fusion algorithm, resulting in a relatively small difference between a frequency range of noise and a frequency range of image details. Consequently, the noise cannot be distinguished from the image details in a composited image, and an excessively large noise is caused in the composited image. In addition, because only a color component of the visible light image is used to composite the image, in the low illumination scenario, the visible light image is prone to color loss and a color cast, causing color distortion of an image composited based on the visible light image and the infrared light image. In the low illumination scenario, texture of the infrared light image is clearer than that of the visible light image. However, luminance distribution and texture details of the visible light image have a relatively great difference, and luminance and texture in the composited image tend to apply luminance and the texture of the infrared light image. Consequently, problems such as a large difference between the texture of the composited image and texture under an actual visible light are caused. Therefore, to resolve problems such as color distortion, a large difference of luminance and texture, and large noise in the conventional solution, this embodiment of this application provides an image processing method.

It should be understood that, the low illumination scenario described in this embodiment of this application is a scenario in which illumination is lower than a threshold. A low-illumination threshold may be adjusted depending on a feature, such as a sensor or an optical splitter, of a device in an actual optical imaging system. For example, if a feature of the device is relatively good, the threshold may be decreased; or if a feature of the device is relatively bad, the threshold may be increased.

Figure 1:
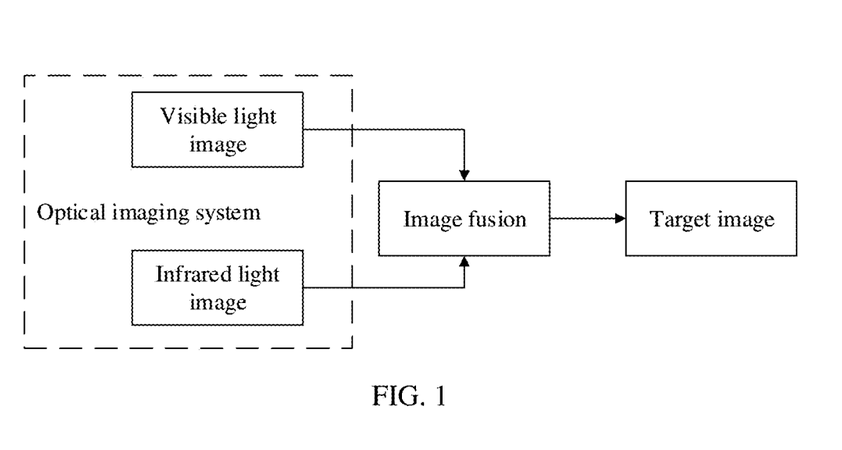
FIG. 1 is a framework diagram of an image processing method according to an embodiment of this application.

A framework of the image processing method in this embodiment of this application is shown in FIG. 1. A visible light image and an infrared light image may be obtained by using an optical imaging system. The optical imaging system may include a camera lens of a monitoring device, or a camera lens of a terminal device or a camera. Then, image fusion is performed on the visible light image and the infrared light image, to obtain a target image. Luminance information, texture information, and color information of the visible light image and the infrared light image may be separately fused, to obtain a clear target image, and texture and color of the target image may be closer to texture and color of an actual image.

Figure 2:
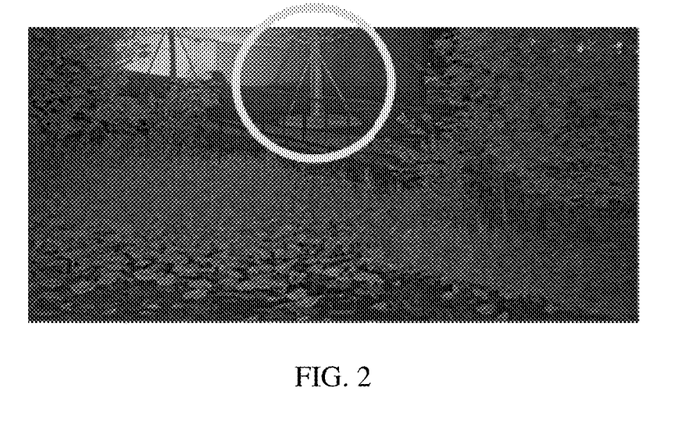
FIG. 2 is a schematic diagram of a composited image in a conventional solution.

According to the image processing method provided in this embodiment of this application, the texture and color of the obtained target image can be closer to the actual texture and color. For example, an image obtained in the conventional solution is shown in FIG. 2. In the low illumination scenario, when image fusion is performed in the conventional solution, luminance and texture of the infrared light image is clearer than luminance and texture of the visible light image. Therefore, a proportion of the luminance of the infrared light image is greater than a proportion of the luminance of the visible light image, causing a relatively large difference between luminance of the image after fusion and luminance and texture under an actual visible light. For example, luminance of a composited "tree" in the image shown in FIG. 2 is quite high, greatly differing from luminance of the "tree" under the actual visible light.

Figure 3:
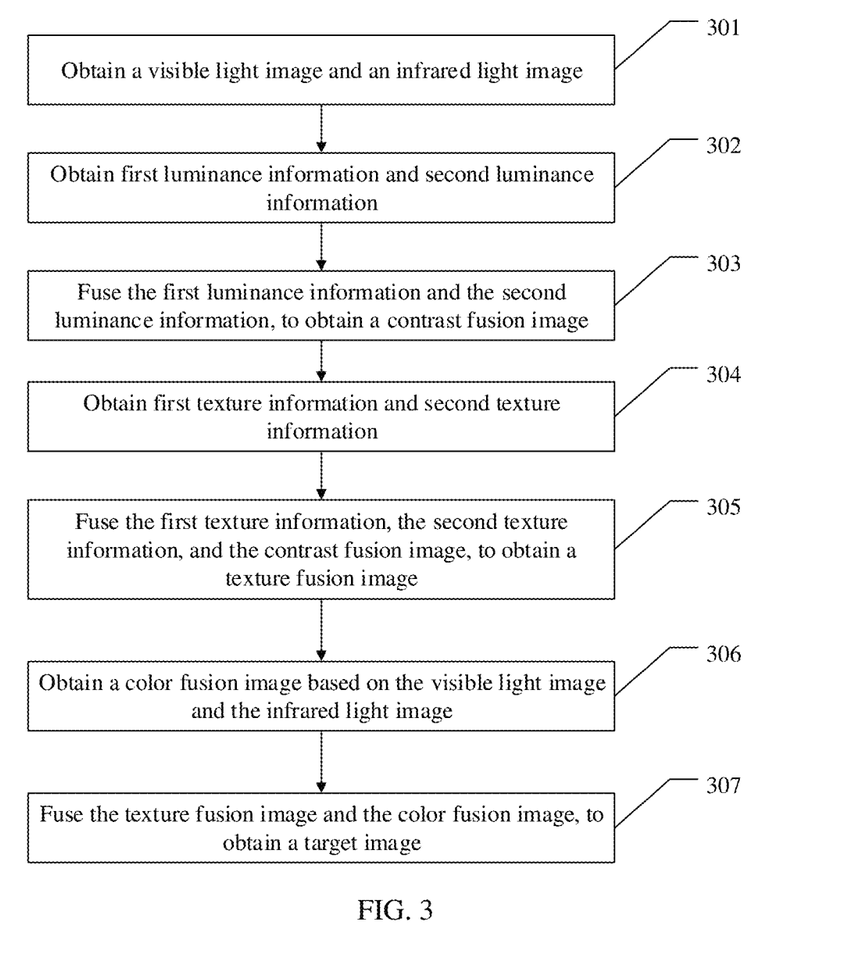
FIG. 3 is a flowchart of an image processing process according to an embodiment of this application.

Therefore, in this embodiment of this application, luminance information and texture information are obtained from the visible light image and the infrared light image, respectively, to obtain a clearer texture fusion image. A color fusion image is obtained by using color information of the visible light image and the infrared light image, and is composited with the texture fusion image into a target image, to enhance a color of the image. Referring to FIG. 3, a specific procedure of image processing in this embodiment of this application includes the following steps.

301: Obtain a visible light image and an infrared light image.

The visible light image and the infrared light image may be obtained by using an optical imaging system. For example, the visible light image and the infrared light image may be obtained by using a camera lens of a monitoring device, or may be obtained by using a one or more camera lenses of a mobile phone.

302: Obtain first luminance information and second luminance information.

After the visible light image and the infrared light image are obtained, the luminance information is separately obtained from the visible light image and the infrared light image. The first luminance information is luminance information in the visible light image, and the second luminance information is luminance information in the infrared light image. The first luminance information may include a luminance value of each pixel in the visible light image, and the second luminance information may include a luminance value of each pixel in the infrared light image.

303: Fuse the first luminance information and the second luminance information, to obtain a contrast fusion image.

The first luminance information and the second luminance information are fused, to obtain the contrast fusion image. A specific fusion manner may be: calculating the luminance value in the first luminance information and the luminance value in the second luminance information in proportion, to obtain a target luminance value of each pixel. Then, a contrast fusion image is formed by the target luminance value of each pixel, so that luminance of the obtained contrast fusion image is closer to luminance of an actual image. The proportion may be obtained based on a formula, or may be a preset proportion. For example, if a luminance value of a pixel in the visible light image is 200 nit, and a luminance value of a corresponding pixel in the infrared light image is 400 nit, a ratio of the luminance value in the visible light image to the luminance value in the infrared light image may be calculated based on a preset formula. For example, the luminance value of the pixel obtained by calculation is 320 nit.

304: Obtain first texture information and second texture information.

The first texture information is obtained from the visible light image, and the second texture information is obtained from the infrared light image. In an actual scenario, texture of the infrared light image is usually clearer than texture of the visible light image. Therefore, a higher proportion of the texture of the infrared light image may be used for image composition.

It should be noted that a sequence of performing step 302 and step 304 is not limited in this embodiment of this application. Step 302 may be performed first, or step 304 may be performed first. This is not specifically limited herein.

305: Fuse the first texture information, the second texture information, and the contrast fusion image, to obtain a texture fusion image.

After the first texture information and the second texture information are obtained, pixel values of all texture in the visible light image and the infrared light image may be obtained, and a pixel value in the first texture information and a pixel value in the second texture information may be calculated, to obtain a target texture pixel value. Then, the target texture pixel value is superimposed to the contrast fusion image, to obtain the texture fusion image, so that texture of the obtained texture fusion image is clearer.

In a low illumination scenario, less texture details in the infrared light image are richer than the texture details in the visible light image. Also noise in the infrared light image is less than noise in the visible light image. Therefore, during texture fusion, a proportion of the richer texture information of the infrared light image may be increased, so that the obtained texture fusion image has clearer texture and less noise.

It should be noted that a sequence of performing step 302 and step 305 is not limited in this embodiment of this application. Step 302 may be performed first, or step 305 may be performed first. This is not specifically limited herein.

306: Obtain a color fusion image based on the visible light image and the infrared light image.

Color information is separately obtained from the visible light image and the infrared light image. Color perception restoration may be performed on the visible light image to obtain the color information of the visible light image, and color inference learning may be performed on the infrared light image based on a preset color correspondence, to obtain the color information of the infrared light image, to fill some missing color in the visible light image. The color information of the visible light image and the color information of the infrared light image are calculated, to obtain a color component of each pixel in the color fusion image.

In the low illumination scenario, granular noise of a color is large and color distortion may be severe in the visible light image. The color information obtained through inference learning from the infrared light image and the color information obtained through perception restoration from the visible light image are fused, so that noise of a color of the color fusion image is less, and the color is closer to the color under the actual visible light.

307: The texture fusion image and the color fusion image are fused, to obtain a target image.

After the texture fusion image and the color fusion image are obtained, a luminance component of the target image may be obtained based on the texture fusion image, and the color component of the target image may be obtained based on the color fusion image. Then, the luminance component and the color component are combined, to obtain the target image.

In this embodiment of this application, after the visible light image and the infrared light image are obtained, the luminance information is separately obtained from the visible light image and the infrared light image, and the contrast fusion image is obtained based on the luminance information. Then, the texture information obtained from the visible light image, the texture information obtained from the infrared light image, and the contrast fusion image are fused, to obtain the texture fusion image. Compared with an original visible light image and an original infrared light image, texture in the texture fusion image is clearer, and luminance distribution is closer to luminance distribution under the actual visible light. Then, the color fusion image is obtained based on the color information separately obtained from the visible light image and the infrared light image. A color obtained through inference from the infrared light image can be used to fill the missing color in the visible light image, so that the obtained color fusion image can include complete colors. Therefore, the texture of the target image obtained based on the color fusion image and the texture fusion image is clearer, the luminance distribution is closer to the luminance distribution under the actual light, and the color in the target image is more complete. This reduces color loss of the target image caused by color loss of the visible light image. In addition, when fusion for obtaining the target image is performed, the luminance information and the texture information of the infrared light image and the visible light image are separately fused, so that noise in the composited target image can be reduced.

Figure 4:
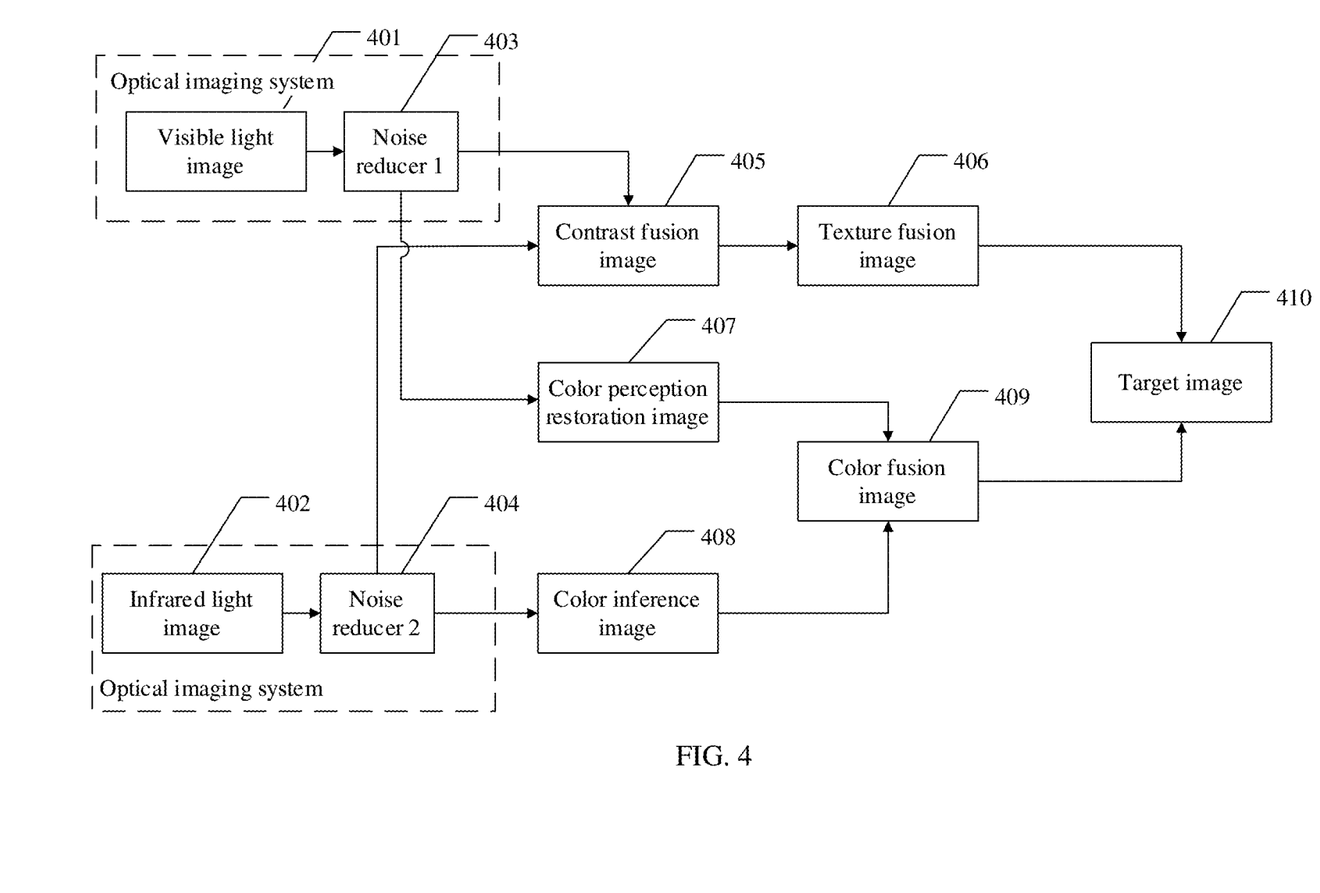
FIG. 4 is a schematic diagram of an image processing apparatus according to an embodiment of this application.

The following describes specific steps of the image processing method in this embodiment of this application. FIG. 4 is a block diagram of the image processing method according to an embodiment of this application.

First, a visible light image 401 and an infrared light image 402 are separately obtained by using an optical imaging system. Then, the visible light image 401 passes through a noise reducer 1 (403), to filter out a part of noise, for example, granular noise in the visible light image. The infrared light image 402 passes through a noise reducer 2 (404), to filter out a part of noise in the visible light image. The noise reducer 1 and the noise reducer 2 may be image signal processing (ISP) noise reducers. The ISP noise reducers may perform image processing, including exposure control, white balance control, noise reduction, and the like on the infrared light image and the visible light image. After being processed by the ISP noise reducer 1 and the ISP noise reducer 2, the image is a YUV (luminance signal Y and chrominance signal U and V)-format image with accurate color and luminance distribution. That is, a luminance component of the visible light image and a luminance component of the infrared light image may be obtained.

Figure 5:
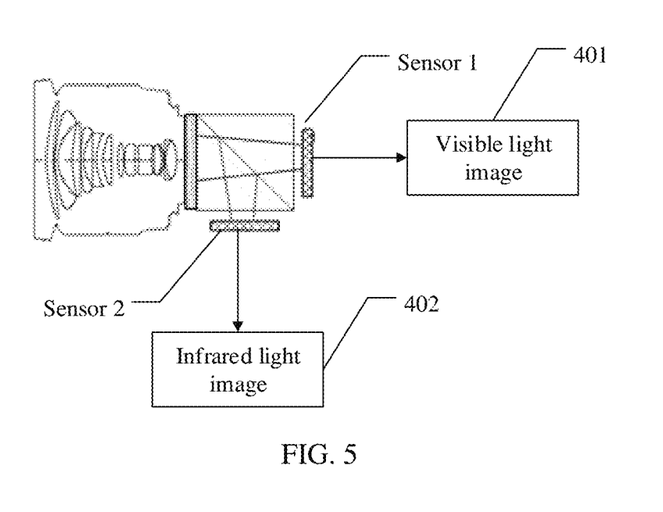
FIG. 5 is a schematic diagram of an optical imaging system according to an embodiment of this application.

The optical imaging system may be one or more camera lenses. That there is only one camera is used as an example herein. For example, as shown in FIG. 5, the lens may include multilayer lenses. First, the lens collects an image, and then light may be split by using a light-splitting prism. A visible light image 401 is generated on a sensor 1, and an infrared light image 402 is generated on a sensor 2. In the optical imaging system, a separate imaging apparatus may directly generate the visible light image and the infrared light image, respectively. This may be specifically adjusted based on an actual design requirement, and is not limited herein.

First luminance information is extracted from the visible light image obtained after a part of noise is filtered out. Second luminance information is extracted from the infrared light image. The first luminance information and the second luminance information are fused to obtain a contrast fusion image 405. A specific fusion process may be: separately calculating a local contrast in the visible light image and a corresponding local contrast in the infrared light image, and then calculating, based on a preset gradient feature, a weight of each component in the local contrast in the visible light image and a weight of each component in the corresponding local contrast in the infrared light image. A specific contrast fusion process may be: using a part of the infrared light image and a corresponding part of the visible light image as an example, when a difference is relatively large between the local contrast of the infrared light image and the preset gradient feature, and between the local contrast of the visible light image and the preset gradient feature, the local contrast in the infrared light image is preferred when the contrast fusion image is composited. To be specific, when the difference is relatively large between the local contrast of the infrared light image and the preset gradient feature, and between the local contrast of the visible light image and the preset gradient feature, a weight occupied by the local contrast in the infrared light image is larger, and the local contrast in the infrared light image is mostly used as the local contrast in the contrast fusion image.

In an actual application, the specific contrast fusion process may be: using a corresponding part of the infrared light image and a corresponding part of the visible light image as an example, the part may be a pixel matrix, for example, a 6×6 pixel matrix. A first luminance component of a partial visible light image is obtained by using a first weight matrix of a pixel of the part in the visible light image and a corresponding first partial image window. The first weight matrix is a weight matrix of a pixel in an image window of the part in the visible light image. The first weight matrix may be preset, or may be obtained through calculation based on actual luminance value data. A second luminance component of the corresponding part in the infrared light image is obtained by using a second weight matrix of the part in the infrared light image and a corresponding partial image window. The second weight matrix is a weight matrix of a pixel in an image window of the part in the infrared light image. The second weight matrix may be preset, or may be obtained through calculation based on actual data. Then, a proper luminance value s is calculated based on a first formula, the first luminance component, and the second luminance component. The first formula may be min $\|W_i^{1/2}(p_i-Q_i s_i)\|_2^2 + \mu_c \|s_i - s_i^0\|_2^2$, where P is a luminance value of the visible light image, W is a preset fixed matrix, Q is a luminance value of the infrared light image, is a preset coefficient and may be adjusted based on an actual requirement, and $s_i$ is a luminance value of a pixel i. After a target luminance value s of each pixel is obtained through calculation, the obtained luminance value is migrated to the infrared light image, and a transformation matrix x' of the infrared light image after contrast migration may be obtained based on s, where x'=x*s, to obtain the contrast fusion image.

After the contrast fusion image 405 is obtained, a texture fusion image 406 is obtained by using the contrast fusion image 405. First texture information is extracted from the visible light image obtained after a part of noise is filtered out, and second texture information is extracted from the infrared light image obtained after a part of noise is filtered out. Then, pixel values included in the first texture information and the second texture information are superimposed. Pixel values included in the first texture information and the second texture information are superimposed to the contrast fusion image, to obtain the texture fusion image. A specific process may be: calculating details in the visible light image and details in the infrared light image, then calculating an optimal pixel value, namely, a target pixel value, of each detail texture based on a preset formula, and superimposing the optimal pixel value of each detail texture into the contrast fusion image, to obtain the texture fusion image 406.

Specifically, fusion of a pixel is used as an example. A process performed in the partial visible light image may include: obtaining a current visible light pixel $x^{O(\iota^*)}$ and a pixel value $x^{o,b}$ of a non-local average filtered visible light, and performing subtraction to obtain a visible light texture detail in the visible light image, that is, $\Delta x^{O(\iota^*)} = x^{O(f^*)} - x^{o,b}$. A process performed in the partial infrared light image may include: obtaining a pixel value $x^n$ of a non-local average filtered infrared light and a pixel value $x^{n,b}$ of a current infrared image, performing subtraction to obtain an infrared light texture detail in the infrared light image, that is, $\Delta x^n = x^n - x^{n,b}$, and then calculating an optimal texture detail value $\Delta x$ based on a preset second formula. The second formula may be $$\min_{\Delta x}\left\{\mu_d\|\Delta x - \Delta x^{o(\iota^*)}\|_2^2 + \sum_{j=1}^{2}|(\Delta x \otimes f^j) - (\Delta x^n \otimes f^j)|\right\},$$

where $\mu_d$ is a preset coefficient and may be adjusted based on an actual requirement, and $f^j$ is a preset partial weighting matrix. The pixel value of the image obtained through calculation is superimposed to the contrast fusion image, to obtain a pixel value $x^{o(\iota^*)} \leftarrow x^{o,b} + \Delta x$ in the texture fusion image.

In addition, in this embodiment, color fusion is further performed on the visible light image obtained after the noise reduction and the infrared light image obtained after the noise reduction, to obtain a color fusion image 409. A specific process of performing color fusion may be: performing color perception restoration on the visible light image after a part of noise is filtered out, to obtain a color perception restoration image 407. A specific process of performing color perception restoration may be: performing luminance inversion on the visible light image after the part of noise is filtered out, to obtain a visible light image after luminance inversion, enhancing luminance and a color of the visible light image after luminance inversion by using a defogging algorithm, and then inverting the reversed image after the luminance and the color are enhanced, to obtain the visible light image with enhanced luminance and an enhanced color. For example, a proportional relationship between grayscale values of neighboring pixels in the visible light image after luminance inversion is calculated, and then a grayscale value of each pixel is corrected based on the proportional relationship. Linear enhancement is performed on the grayscale value of the corrected pixel, to obtain an enhanced inversion image, and the inversion image is inversed, to obtain the visible light image with enhanced luminance and an enhanced color.

However, for a partial image whose color information is partially lost or a color cast is excessively large in the visible light image, correction cannot be performed by color perception restoration. Therefore, if luminance of the partial image in the visible light image is excessively low or noise is excessively high, color inference may be further performed on the infrared light image, to further correct color loss, a color cast, or the like in the visible light image.

There is a correspondence between a color component in the infrared light image and a color component in the visible light image. The correspondence may be preset, or may be a correspondence between an RGB (red, green, blue) component in the infrared light image and a color in the visible light image, and the correspondence is obtained by using large amount of data and through machine learning. Therefore, the color component in the infrared light image may be inferred based on the correspondence, to obtain an image corresponding to the color of the visible light image, and to obtain a color inference image 408. A part of color loss or a color cast in the visible light may be corrected by using the color inference image, to obtain an image whose color is closer to an actual light.

It should be understood that an obtaining sequence of the color perception restoration image 407 and the color inference image 408 is not limited in this embodiment of this application. The color perception restoration image 407 may be first obtained, or the color inference image 408 may be first obtained. This may be specifically adjusted based on an actual requirement, and is not specifically limited herein.

Therefore, the color perception restoration image 407 and the color inference image 408 may be fused, to obtain the color fusion image 409. In an actual application, color correction may be determined to be performed depending on a luminance value of the visible light image. If luminance of a part in the color perception restoration image is excessively low or noise is excessively large, a reference ratio of a corresponding part in the color inference image may be increased, that is, a color of the part with excessively low luminance or excessively large noise may be corrected by using a color component of a corresponding part in the color inference image, to obtain a color fusion image with a more complete color. Therefore, a color of the target image is determined by using the visible light image and the infrared light image, so that color noise, color distortion, and a smudge of the target image can be improved in a low illumination scenario.

It should be understood that a sequence of obtaining the texture fusion image 406 and the color fusion image 409 is not limited in this embodiment of this application. The texture fusion image 406 may be obtained first, or the color fusion image 409 may be obtained first. This may be specifically adjusted based on an actual requirement, and is not specifically limited herein.

After the texture fusion image 406 and the color fusion image 409 are obtained, the texture fusion image and the color fusion image are fused, and a texture detail in the texture fusion image and a color component in the color fusion image are superimposed and combined, to obtain a target image 410.

In this embodiment of this application, the luminance information is separately obtained from the visible light image and the infrared light image. The contrast fusion image is obtained based on the luminance information. Then, the texture information obtained from the visible light image, the texture information obtained from the infrared light image, and the contrast fusion image are fused, to obtain the texture fusion image. Texture in the obtained texture fusion image is clearer, and luminance distribution is closer to luminance distribution under an actual visible light. Then, the color fusion image is obtained based on the color information separately obtained from the visible light image and the infrared light image. A color obtained through inference from the infrared light image can be used to fill a missing color in the visible light image, and the obtained color fusion image can include complete colors.

Therefore, the texture of the target image obtained by using the color fusion image and the texture fusion image is clearer, the luminance distribution is closer to the luminance of the actual light, and the color in the target image is more complete. This reduces the color loss of the target image caused by the color loss of the visible light image. In addition, during fusion of the target image, the luminance information and the texture information that are in the infrared light image and the visible light image are separately fused, so that noise in the synthesized target image can be reduced, color loss, a color cast, or the like of the composited image can be reduced, and color noise, color distortion, and a smudge of the target image obtained at low illumination can be improved.

The image processing method in the embodiments of this application is described above in detail. The following describes an image processing apparatus in an embodiment of this application.

Figure 6:
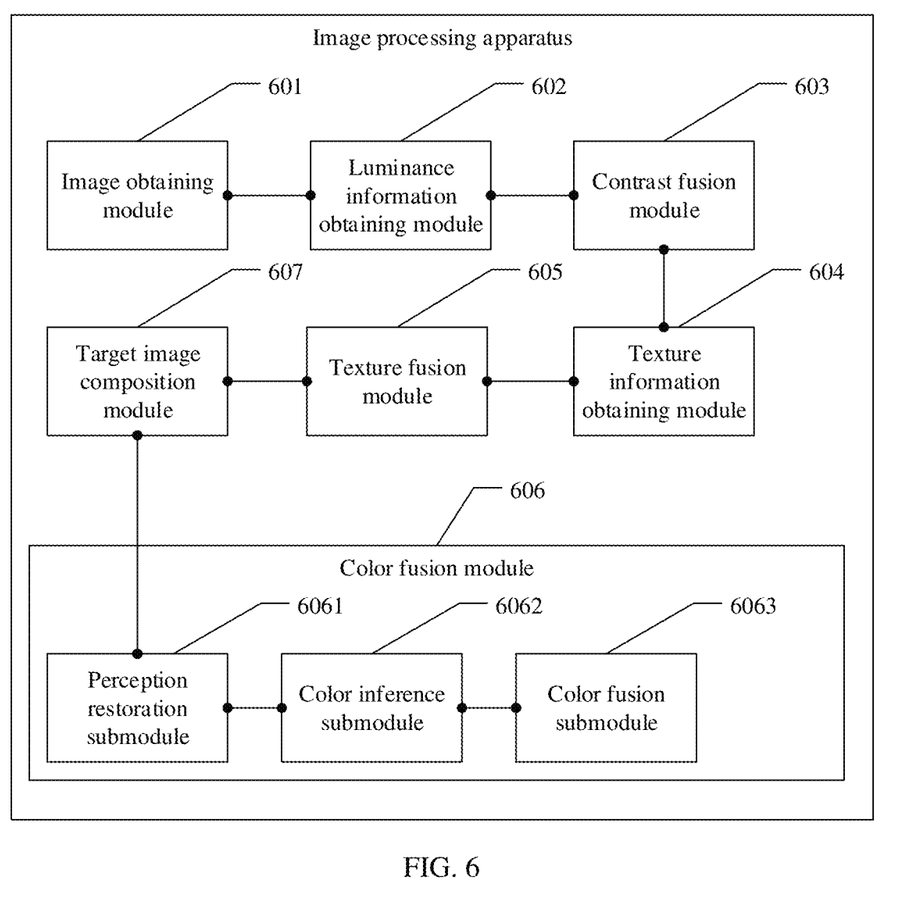
FIG. 6 is a schematic diagram of an image processing apparatus according to an embodiment of this application.

FIG. 6 is a schematic diagram of an embodiment of an image processing apparatus according to this embodiment of this application, and the apparatus may include: an image obtaining module 601, configured to obtain a visible light image and an infrared light image (for example, as described in relation to operation 301 above); a luminance information obtaining module 602, further configured to obtain first luminance information and second luminance information (for example, as described in relation to operation 302 above), where the first luminance information is luminance information of the visible light image, and the second luminance information is luminance information of the infrared light image; a contrast fusion module 603, configured to fuse the first luminance information and the second luminance information, to obtain a contrast fusion image (for example, as described in relation to operation 303 above); a texture information obtaining module 604, further configured to obtain first texture information and second texture information (for example, as described in relation to operation 304 above), where the first texture information is texture information of the visible light image, and the second texture information is texture information of the infrared light image; a texture fusion module 605, configured to fuse the first texture information, the second texture information, and the contrast fusion image, to obtain a texture fusion image (for example, as described in relation to operation 305 above); a color fusion module 606, configured to obtain a color fusion image based on the visible light image and the infrared light image (for example, as described in relation to operation 306 above); and a target image composition module 607, configured to fuse the texture fusion image and the color fusion image, to obtain a target image (for example, as described in relation to operation 307 above).

Optionally, in some possible embodiments, the color fusion module 606 may include: a perception restoration submodule 6061, configured to perform color perception restoration on the visible light image, to obtain a color perception restoration image; a color inference submodule 6062, configured to perform color inference on the infrared light image based on a preset color correspondence, to obtain a color inference image; and a color fusion submodule 6063, configured to fuse the color perception restoration image and the color inference image, to obtain the color fusion image.

Optionally, in some possible embodiments, the contrast fusion module 603 is specifically configured to: calculate the first luminance information and the second luminance information by using a preset first formula, to obtain a target luminance value; and obtain the contrast fusion image based on the target luminance value.

Optionally, in some possible embodiments, the texture fusion module 605 is specifically configured to: calculate the first texture information and the second texture information by using a preset second formula, to obtain a target texture pixel value; and superimpose the target texture pixel value to the contrast fusion image, to obtain the texture fusion image.

Optionally, in some possible embodiments, the color inference submodule 6062 is specifically configured to: determine a proportion of a color component of the infrared light image based on the preset color correspondence; and determine a target color based on the proportion of the color component in a preset calculation manner, to obtain the color inference image.

Optionally, in some possible embodiments, the perception restoration submodule 6061 is specifically configured to: invert luminance of the visible light image, to obtain a luminance inversion image; calculate the luminance inversion image based on a defogging algorithm, to obtain an enhanced image of enhanced luminance and an enhanced color; and invert the enhanced image, to obtain the color perception restoration image.

Optionally, in some possible embodiments, the target image composition module 607 is specifically configured to: fuse luminance information of the texture fusion image and a color component in the color fusion image, to obtain the target image.

In another possible implementation, when the image processing apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the image processing method in any design of the first aspect. Optionally, the storage unit may be a storage unit in the chip, such as a register or a buffer, or the storage unit may be a storage unit outside the chip in the terminal, such as a read-only memory (ROM), another type of static storage device capable of storing static information and instructions, or a random access memory (RAM).

The foregoing processor may be a general-purpose central processing unit (CPU), a microprocessor, an application-specific integrated circuit (ASIC), or one or more integrated circuits for controlling program execution of the wireless communication method in the first aspect.

Figure 7:
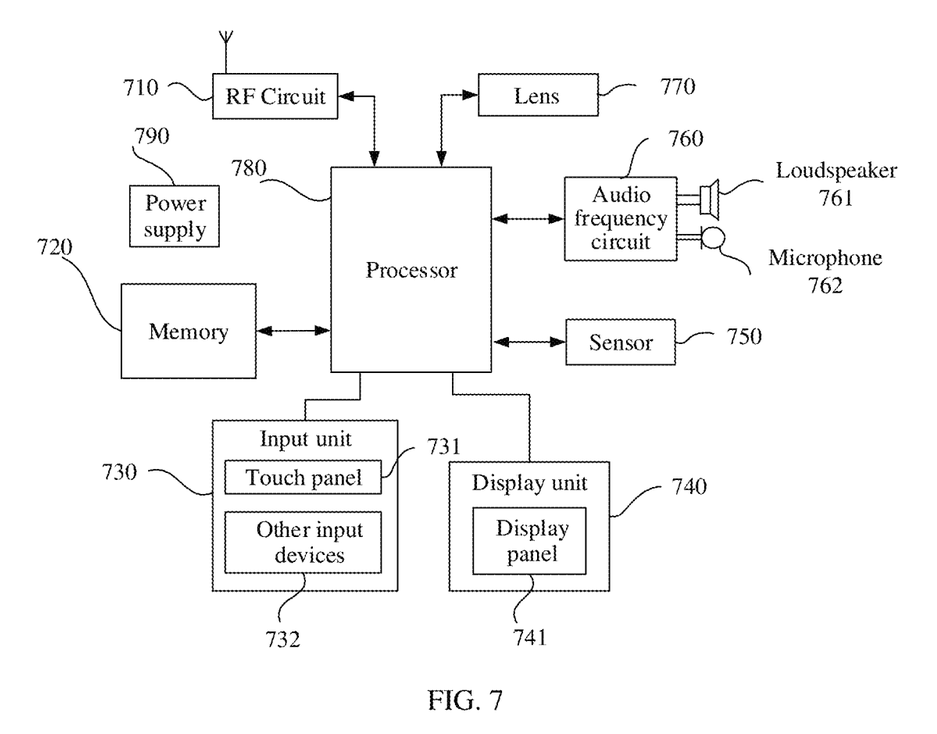
FIG. 7 is a schematic diagram of an image shooting apparatus according to an embodiment of this application.

An embodiment further provides an image shooting apparatus, as shown in FIG. 7. For ease of description, only a part related to this embodiment is illustrated. For specific technical details that are not disclosed, refer to the method part of the embodiments. The image shooting apparatus may be any terminal device, including a mobile phone, a tablet computer, a PDA (personal digital assistant), a POS (point of sales), a vehicle-mounted computer, or the like.

FIG. 7 shows a block diagram of a partial structure of an image shooting apparatus according to an embodiment. Referring to FIG. 7, the image shooting apparatus includes components such as a radio frequency (RF) circuit 710, a memory 720, an input unit 730, a display unit 740, a sensor 750, an audio frequency circuit 760, a lens 770, a processor 780, and a power supply 790. Persons skilled in the art may understand that a structure of the image shooting apparatus shown in FIG. 7 does not constitute a limitation on the image shooting apparatus, and the image shooting apparatus may include more or fewer components than those shown in the figure, or some components are combined, or a different component arrangement may be used.

The following describes each constituent part of the image shooting apparatus in detail with reference to FIG. 7.

The RF circuit 710 may be configured to receive and send a signal during information receiving and sending or in a call process. Particularly, after receiving downlink information of a base station, the RF circuit 710 sends the downlink information to the processor 780. In addition, the RF circuit 700 sends uplink-related data to a base station. Usually, the RF circuit 710 includes but is not limited to an antenna, at least one amplifier, a transceiver, a coupler, a low noise amplifier (LNA), a duplexer, and the like. Further, the RF circuit 710 may communicate with a network and other device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

The memory 720 may be configured to store a software program and one or more modules. The processor 780 performs various function applications of the image shooting apparatus and data processing by running the software program and the one or more modules that are stored in the memory 720. The memory 720 may mainly include a program storage area and a data storage area. The program storage area may store an operating system, an application program necessary for at least one function (for example, a sound playback function or an image playback function), and the like. The data storage area may store data (for example, audio data and a phonebook) created based on use of the image shooting apparatus, and the like. In addition, the memory 720 may include a high-speed random access memory, and may further include a nonvolatile memory, for example, at least one magnetic disk storage device, a flash memory device, or another volatile solid-state storage device.

The input unit 730 may be configured to: receive entered digit or character information, and generate key signal input related to user setting and function control of the image shooting apparatus. Specifically, the input unit 730 may include a touch panel 731 and other input devices 732. The touch panel 731, also referred to as a touchscreen, can collect a touch operation (for example, an operation of the user on or near the touch panel 731 by using any suitable object or attachment such as a finger or a stylus) of a user on or near the touch panel, and drive a corresponding connection device according to a preset program. Optionally, the touch panel 731 may include two parts: a touch detection apparatus and a touch controller. The touch detection device detects a touch position of the user, detects a signal brought by the touch operation, and transmits the signal to the touch controller. The touch controller receives touch information from the touch detection device, converts the touch information into contact coordinates, sends the contact coordinates to the processor 780, and receives a command sent by the processor 780 and execute the command. In addition, the touch panel 731 may be implemented in various types such as a resistance-type, a capacitance-type, an infrared type, and a surface acoustic wave type. The input unit 730 may include the other input devices 732 in addition to the touch panel 731. Specifically, the other input devices 732 may include but are not limited to one or more of a physical keyboard, a function key (such as a volume control key or an on/off key), a trackball, a mouse, a joystick, or the like.

The display unit 740 may be configured to display information entered by the user or information provided for the user, and various menus of the image shooting apparatus. The display unit 740 may include a display panel 741. Optionally, the display panel 741 may be configured in a form of a liquid crystal display (LCD), an organic light-emitting diode (OLED), or the like. Further, the touch panel 731 may cover the display panel 741. When detecting a touch operation on or nearby the touch panel 731, the touch panel 731 transmits the touch operation to the processor 780 to determine a type of the touch event, and then the processor 780 provides a corresponding visual output on the display panel 741 based on the type of the touch event. In FIG. 7, the touch panel 731 and the display panel 741 are used as two independent components to implement an input/output function of the image shooting apparatus. However, in some embodiments, the touch panel 731 and the display panel 741 may be integrated to implement the input/output function of the image shooting apparatus.

The image shooting apparatus may further include at least one sensor 750, such as a light sensor, a motion sensor, and another sensor. Specifically, the optical sensor may include an ambient light sensor and a proximity sensor. The ambient light sensor may adjust luminance of the display panel 741 based on brightness of ambient light. The proximity sensor may turn off the display panel 741 and/or backlight when the mobile terminal is moved to an ear. As a type of the motion sensor, an accelerometer sensor may detect values of acceleration in all directions (usually, three axes), may detect a value and a direction of gravity when image shooting apparatus is still. The accelerometer sensor may be applied to an application (for example, landscape-to-portrait switch, a related game, and magnetometer posture calibration) for identifying a posture of the image shooting apparatus, a function (for example, a pedometer or a knock) related to vibration identification, or the like. Another sensor such as a gyroscope, a barometer, a hygrometer, a thermometer, and an infrared sensor may be further configured in the image shooting apparatus. Details are not described herein again.

The audio frequency circuit 760, a loudspeaker 761, and a microphone 762 may provide an audio interface between the user and the image shooting apparatus. The audio circuit 760 may transmit an electric signal converted from received audio data to the loudspeaker 761, and the loudspeaker 761 converts the electric signal into a sound signal for output. Further, the microphone 762 converts a collected sound signal into the electric signal. The audio circuit 760 receives the electric signal, converts the electric signal into audio data, and output the audio data to the processor 780 for processing. Audio data after the processing is sent to, for example, another image shooting apparatus through the RF circuit 710, or the audio data is output to the memory 720 for further processing.

The lens 770 in the image shooting apparatus may obtain an optical image, including an infrared light image and/or a visible light image. There may be one lens in the image shooting apparatus, or there may be at least two lenses (not shown in the figure). This may be specifically adjusted based on an actual design requirement.

The processor 780 is a control center of the image shooting apparatus and is connected to all parts of the entire image shooting apparatus by using various interfaces and lines. The processor 780 executes various functions of the image shooting apparatus and processes data by running or executing a software program and/or a module stored in the memory 720 and invoking data stored in the memory 720, to perform overall monitoring on the image shooting apparatus. Optionally, the processor 780 may include one or more processing units. Preferably, the processor 780 may integrate an application processor and a modem processor. The application processor mainly processes an operating system, a user interface, an application, and the like, and the modem processor mainly processes wireless communication. It should be understood that, the modem processor may not be integrated in the processor 780.

The image shooting apparatus further includes the power supply 790 (such as a battery) that provides power to all the parts. Preferably, the power supply may be logically connected to the processor 780 through a power management system, to implement functions such as charging and discharging management and power consumption management through the power management system.

Although not shown, the image shooting apparatus may further include a camera, a Bluetooth module, and the like. Details are not described herein.

In this embodiment, the processor 780 included in the image shooting apparatus further has the following functions: obtaining a visible light image and an infrared light image; obtaining first luminance information and second luminance information, where the first luminance information is luminance information of the visible light image, and the second luminance information is luminance information of the infrared light image; fusing the first luminance information and the second luminance information, to obtain a contrast fusion image; obtaining first texture information and second texture information, where the first texture information is texture information of the visible light image, and the second texture information is texture information of the infrared light image; fusing the first texture information, the second texture information, and the contrast fusion image, to obtain a texture fusion image; obtaining a color fusion image based on the visible light image and the infrared light image; and fusing the texture fusion image and the color fusion image, to obtain a target image.

The terminal device provided in this application may be a mobile phone, a camera, a monitor, a tablet computer, or the like. The terminal device may further include one or more lenses. The terminal device is similar to the image shooting apparatus shown in FIG. 7. Details are not described herein again.

It may be clearly understood by persons skilled in the art that, for convenient and brief description, for a detailed working process of the described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and components displayed as units may or may not be physical units. To be specific, the components may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application that are shown in FIG. 3 to FIG. 5. The foregoing storage medium includes: any medium that can store program code, such as a USB flash drive, a removable hard disk, a read-only memory (ROM), a random access memory (RAM), a magnetic disk, and an optical disc.

In conclusion, the foregoing embodiments are merely intended for describing the technical solutions of this application, but not for limitation. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An image processing method, comprising:
obtaining a visible light image and an infrared light image;
obtaining first luminance information and second luminance information, wherein the first luminance information is luminance information of the visible light image, and the second luminance information is luminance information of the infrared light image;
fusing the first luminance information and the second luminance information, to obtain a contrast fusion image;
obtaining first texture information and second texture information, wherein the first texture information is texture information of the visible light image, and the second texture information is texture information of the infrared light image;
fusing the first texture information, the second texture information, and the contrast fusion image, to obtain a texture fusion image;
obtaining a color fusion image based on the visible light image and the infrared light image; and
fusing the texture fusion image and the color fusion image, to obtain a target image.

2. The method according to claim 1, wherein the obtaining a color fusion image based on the visible light image and the infrared light image comprises:
   performing color perception restoration on the visible light image, to obtain a color perception restoration image;
   performing color inference on the infrared light image based on a preset color correspondence, to obtain a color inference image; and
   fusing the color perception restoration image and the color inference image, to obtain the color fusion image.

3. The method according to claim 2, wherein the performing color inference on the infrared light image based on a preset color correspondence comprises:
   determining a proportion of a color component of the infrared light image based on the preset color correspondence; and
   determining a target color based on the proportion of the color component in a preset calculation manner, to obtain the color inference image.

4. The method according to claim 2, wherein the performing color perception restoration on the visible light image comprises:
   inverting luminance of the visible light image, to obtain a luminance inversion image;
   calculating the luminance inversion image based on a defogging algorithm, to obtain an enhanced image of enhanced luminance and an enhanced color; and
   inverting the enhanced image, to obtain the color perception restoration image.

5. The method according to claim 1, wherein the fusing the first luminance information and the second luminance information comprises:
   calculating the first luminance information and the second luminance information by using a preset first formula, to obtain a target luminance value; and
   obtaining the contrast fusion image based on the target luminance value.

6. The method according to claim 1, wherein the fusing the first texture information, the second texture information, and the contrast fusion image comprises:
   calculating the first texture information and the second texture information by using a preset second formula, to obtain a target texture pixel value; and
   superimposing the target texture pixel value to the contrast fusion image, to obtain the texture fusion image.

7. The method according to claim 1, wherein the fusing the texture fusion image and the color fusion image comprises:
   fusing luminance information of the texture fusion image and a color component in the color fusion image, to obtain the target image.

8. A non-transitory computer readable storage medium storing instructions which, when executed by one or more processors, cause the one or more processors to perform operations comprising:
   obtaining a visible light image and an infrared light image;
   obtaining first luminance information and second luminance information, wherein the first luminance information is luminance information of the visible light image, and the second luminance information is luminance information of the infrared light image;
   fusing the first luminance information and the second luminance information, to obtain a contrast fusion image;
   obtaining first texture information and second texture information, wherein the first texture information is texture information of the visible light image, and the second texture information is texture information of the infrared light image;
   fusing the first texture information, the second texture information, and the contrast fusion image, to obtain a texture fusion image;
   obtaining a color fusion image based on the visible light image and the infrared light image; and
   fusing the texture fusion image and the color fusion image, to obtain a target image.

9. The computer readable storage medium according to claim 8, wherein the operations further comprise:
   performing color perception restoration on the visible light image, to obtain a color perception restoration image;
   performing color inference on the infrared light image based on a preset color correspondence, to obtain a color inference image; and
   fusing the color perception restoration image and the color inference image, to obtain the color fusion image.

10. The computer readable storage medium according to claim 9, wherein the operations further comprise:
    determining a proportion of a color component of the infrared light image based on the preset color correspondence; and
    determining a target color based on the proportion of the color component in a preset calculation manner, to obtain the color inference image.

11. The computer readable storage medium according to claim 9, wherein the operations further comprise:
    inverting luminance of the visible light image, to obtain a luminance inversion image;
    calculating the luminance inversion image based on a defogging algorithm, to obtain an enhanced image of enhanced luminance and an enhanced color; and
    inverting the enhanced image, to obtain the color perception restoration image.

12. The computer readable storage medium according to claim 8, wherein the operations further comprise:
    calculating the first luminance information and the second luminance information by using a preset first formula, to obtain a target luminance value; and
    obtaining the contrast fusion image based on the target luminance value.

13. The computer readable storage medium according to claim 8, wherein the operations further comprise:
    calculating the first texture information and the second texture information by using a preset second formula, to obtain a target texture pixel value; and
    superimposing the target texture pixel value to the contrast fusion image, to obtain the texture fusion image.

14. An image shooting apparatus, comprising:
    at least one lens, a memory, and an input/output interface, wherein
    the memory stores program code; and
    the processor is connected to the at least one lens, the memory and the input/output interface, and is configured to, by executing the stored program code:
    obtain, using the at least one lens and in accordance with input received from the input/output interface, a visible light image and an infrared light image;
    obtain first luminance information and second luminance information, wherein the first luminance information is luminance information of the visible light image, and the second luminance information is luminance information of the infrared light image;
fuse the first luminance information and the second luminance information, to obtain a contrast fusion image;
obtain first texture information and second texture information, wherein the first texture information is texture information of the visible light image, and the second texture information is texture information of the infrared light image;
fuse the first texture information, the second texture information, and the contrast fusion image, to obtain a texture fusion image;
obtain a color fusion image based on the visible light image and the infrared light image; and
fuse the texture fusion image and the color fusion image, to obtain a target image.

15. The apparatus according to claim 14, wherein the processor is further configured to:
perform color perception restoration on the visible light image, to obtain a color perception restoration image;
perform color inference on the infrared light image based on a preset color correspondence, to obtain a color inference image; and
fuse the color perception restoration image and the color inference image, to obtain the color fusion image.

16. The apparatus accord to claim 15, wherein the processor is further configured to:
invert luminance of the visible light image, to obtain a luminance inversion image;
calculate the luminance inversion image based on a defog algorithm, to obtain an enhanced image of enhanced luminance and an enhanced color; and
invert the enhanced image, to obtain the color perception restoration image.

17. The system according to claim 14, wherein the processor is further configured to:
calculate the first luminance information and the second luminance information by use a preset first formula, to obtain a target luminance value; and
obtain the contrast fusion image based on the target luminance value.

18. The system according to claim 14, wherein the processor is further configured to:
calculate the first texture information and the second texture information by use a preset second formula, to obtain a target texture pixel value; and
superimpose the target texture pixel value to the contrast fusion image, to obtain the texture fusion image.

19. The system according to claim 14, wherein the processor is further configured to:
determine a proportion of a color component of the infrared light image based on the preset color correspondence; and
determine a target color based on the proportion of the color component in a preset calculation manner, to obtain the color inference image.

* * * * *